April 8, 1952  M. E. BROWN  2,592,239

COVER LOCKING MECHANISM

Filed April 7, 1948

MORRIS E. BROWN
INVENTOR
BY *[signatures]*
ATTORNEYS

Patented Apr. 8, 1952

2,592,239

UNITED STATES PATENT OFFICE 2,592,239

COVER LOCKING MECHANISM

Morris E. Brown, Rochester, N. Y., assignor to Eastman Kodak Company, Rochester, N. Y., a corporation of New Jersey Application April 7, 1948, Serial No. 19,537

7 Claims. (Cl. 292—241)

The present invention relates to a latching or locking mechanism, and more particularly to a locking mechanism primarily designed for detachably connecting the cover of a camera to the camera body.

The principal object of the invention is the provision of a locking mechanism in which the parts carried by the cover are maintained in a proper position to be moved into locking relation with the camera body.

Still another object of the invention is the provision in a locking mechanism of the class described of means for imparting a predetermined tension to the locking member of the cover to insure proper engaging relation with the camera body.

To these and other ends, the invention resides in certain improvements and combinations of parts, all as will be hereinafter more fully described, the novel features being pointed out in the claims at the end of the specification.

Figure 1:
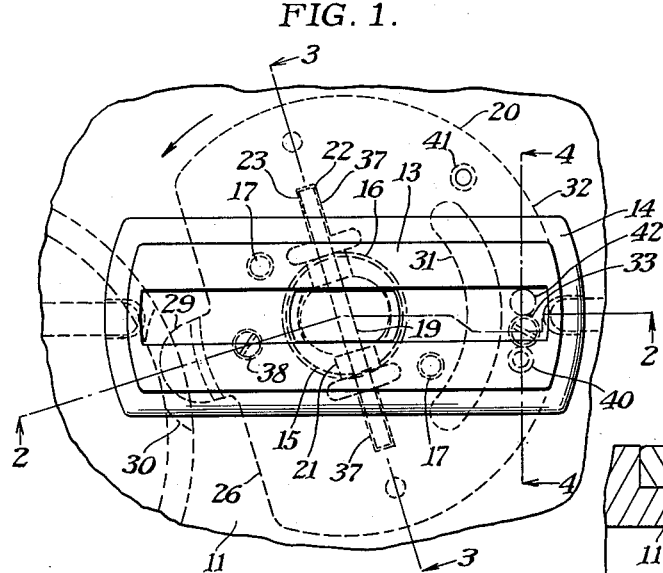
Fig. 1 is a top plan view of a camera cover, showing the relation thereto of a latching or locking mechanism constructed in accordance with the present invention.
Figure 4:
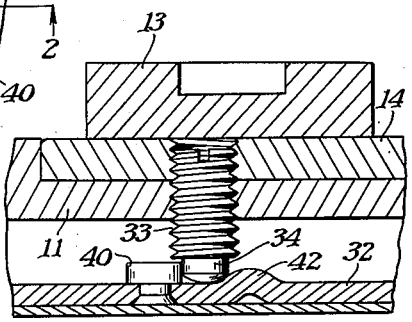
Figure 2:
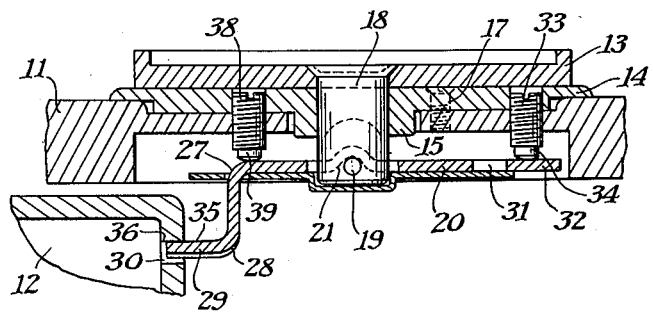
Fig. 2 is a vertical sectional view through the cover and the adjacent portion of the camera body, and taken substantially on line 2—2 of Fig. 1, showing the relation of the locking mechanism when in the engaged position to hold the cover in a closed relation with the camera body.
Figure 3:
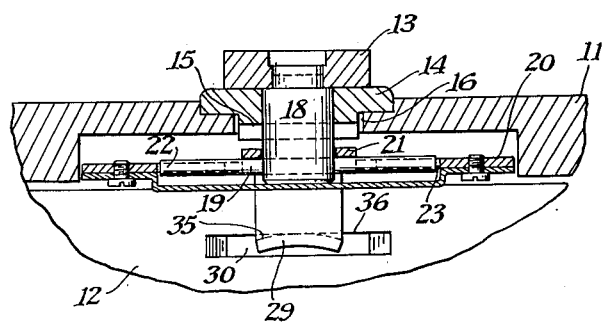

Fig. 3 is also a vertical sectional view through the structure illustrated in Fig. 1 and at right angles to that shown in Fig. 2 and taken substantially on line 3—3 of Fig. 1, showing the arrangement of the latching parts; and Fig. 4 is a partial sectional view of Fig. 1 and taken substantially on line 4—4 thereof, showing the arrangement for limiting the turning of the latching plate and the means for holding the plate releasably in engaging relation with the camera body or support.

The drawings show a portion of a camera cover 11 which is adapted to cooperate with the camera body or support, a portion of which is illustrated at 12 of Fig. 2, to close the body. As the present invention relates to the locking mechanism for locking the cover in a closed position, only so much of the cover and support are illustrated and described as is necessary to a full understanding of the present invention. As is well known, such covers are removable so that access may be had to the interior of the camera body.

The latching mechanism comprises a knob 13 rotatably mounted on a plate 14 formed with a depending boss 15 which extends into an opening 16 formed in the cover 11. The plate 14 may be secured to the cover 11 in any suitable manner, as by screws or rivets 17, so as to form a unitary structure therewith. The knob 13 is secured to the upper end of a shaft 18 which extends downwardly through plate 14 and boss 15 to a point below the latter, as shown in Figs. 2 and 3. A pin 19 is secured to and projects laterally from the lower end of the shaft 18. A latching plate 20 is formed with spaced inverted U-shaped portion 21 arranged on opposite sides of the shaft 18 and positioned to engage the pin 19, as shown in Fig. 2, to pivotly or rockably mount the plate on the pin. The outer ends 22 of the pin 19 lie in grooves or slots 23 formed in the plate 20, the purpose of which construction will be hereinafter more fully pointed out.

One side of the latching plate 20 is cut away, as shown at 26, to provide a radially projecting tongue which is bent at 27 out of the plane of the plate 20 and is again bent at 28 to provide a latch 29 which is positioned below and substantially parallel to the plate 20, as shown in Figs. 2 and 3. This latch is adapted to be received in a slot 30 formed in the adjacent portion of the camera body to releasibly secure the cover 11 thereto. In order to secure the necessary frictional contact between the latch 29 and the slot 30 to draw the cover into tight and light locking relation with the camera body, for reasons well known to those in the art, means is provided for tensioning the latching plate 20. To secure this result, the portion of the plate 20 opposite the latch 29 is formed with an arcuate-shaped slot 31 substantially concentric with shaft 18 to provide a flexible portion 32, as best shown in Figs. 1 and 2. An adjustable screw 33 extends through registering threaded holes in the cover 11 and plate 14 and has the lower end 34 in contact with the portion 32. By adjusting the position of the screw 33, the latching plate 20 may be tensioned so as to hold the upper surface 35 of the latch 29 in tight frictional engagement with the edge 36 of the slot 30 to secure the cover in tight relation with the camera body. To facilitate engagement of the latch 29 in the slot 30, the upper surface 35 of the latch is curved, as best shown in Fig. 3, so that the latter will be cammed into the slot, as is apparent.

Referring now to Fig. 1, it will be apparent that when the knob 13 is turned in a clockwise direction, the pin 19 will rotate as a unit therewith. Such movement of the pin will serve to bring the ends 22 of the latter into engagement with the edges 37 of the slots 23 in the latching plate to turn or rock the plate as a unit with the latter and the pin to withdraw the latch 29 out of engaging relation with the slot 30 to disconnect the cover from the camera body. The cover may then be lifted off the body, as is apparent. As mentioned above, the plate 20 is pivotly mounted on the pin 19 by reason of the U-shaped portions 21 so that when the latch 29 is disengaged, the plate 20 may tend to rock or pivot on the pin 19 so that the latch 29 may be moved to a position in which it will not again engage in the slot 30 when the plate 20 is turned in the opposite direction, the disadvantages of which are deemed obvious.

In order to overcome this difficulty, a second screw 38 extends through registering threaded holes in the cover 11 and plate 14, and has the lower end 39 adjusted to a position almost touching the plate 20 when the latter is in the latched position, as shown in Figs. 1 and 2. Now, when the knob 13 is rotated to disengage the latch 29, as above described, the screw 38 will then pick up the plate 20 and not only hold the plate in position, but also cooperate with the screw 33 to maintain the plate 20 under a slight tension even in the released or unlocked condition so that the latch 29 will be in position to engage again in the slot 30 when the knob 13 is rotated in a counter-clockwise direction.

In order to limit turning of the plate and to position the latter in both the locked and released position, the plate 20 is provided with a pair of spaced studs 40 and 41 riveted or otherwise secured to the plate and positioned in the path of the screw 33. When the latch 29 is in engaging relation with the slot 30, the plate 20 has been turned sufficiently to bring the stud 40 into abutting relation with screw 33 to limit or arrest further turning of the plate to position the latch 29 in the slot 30. Just prior to the engagement of the screw 33 with the stud 40, the screw will pass over a slight protuberance 42 formed on the plate 20 so that in the locked position of the cover the screw 33 will be positioned between the stud 40 and the protuberance 42, as shown in Fig. 4. The latter serves to provide a slight friction to retain the latch in locked relation. When, however, the knob 13 is turned in a clockwise direction, as shown in Fig. 1, the end 34 of the screw will ride over the protuberance 42 and when the plate 20 has been turned sufficiently to disengage latch 29 from the slot 30, the screw 33 will then strike stud 41 to limit further turning of the plate and the associated parts. Thus, the plate is frictionally held in its locked position, yet when released is held so that the latch 29 may be moved again into locking relation with the slot 30.

The present invention thus provides a cover latching mechanism which is simple and effective to hold the cover in tight light-locking relation with the camera body. The mechanism is sturdy, comprises few parts of rugged construction, is simple to operate and highly effective in use. The latching plate is maintained in proper position and under tension in both the locked and released positions.

While one embodiment of the invention has been disclosed, it is to be understood that the inventive idea may be carried out in a number of ways. This application is, therefore, not to be limited to the precise details disclosed, but is intended to cover all variations and modifications thereof which fall within the scope of the appended claims.

I claim:

1. In a cover locking mechanism the combination, with a cover, of a plate rockably mounted on said cover for movement substantially parallel thereto, a latch formed on said plate, means for turning said plate substantially in a plane parallel and relative to said cover to move said latch into and out of engaging relation with a support to connect said cover detachably thereto, means carried by said cover and directly engaging said plate to position the latter on said cover with the latch in position to engage said support, a flexible portion formed on said plate, and means carried by said cover and engaging said portion and cooperating with said second means to tension said plate to retain said latch in tight engagement with said support.

2. In a cover locking mechanism the combination, with a cover, of a plate rockably mounted on said cover, a latch formed on said plate, means for turning said plate relative to said cover to move said latch into and out of engaging relation with a support to connect said cover detachably thereto, an adjustable screw carried by said cover and engaging said plate on the side thereof substantially opposite said latch to tension said plate to provide a predetermined locking friction between said latch and said support, and an adjustable screw carried by said cover and adapted to engage said plate adjacent said latch when the latter is disconnected from said support to maintain the position of said plate relative to said cover.

3. In a cover locking mechanism the combination, with a cover, of a plate rockably mounted on said cover for movement substantially parallel thereto, a latch formed on said plate, means for turning said plate relative to said cover to move said latch into and out of engaging relation with a support to connect said cover detachably thereto, means carried by said cover and engaging said plate to position said plate on said cover with the latch in position to engage said support, means carried by said cover and engaging said plate at a point opposite said second means and cooperating with the latter to tension said plate, and cooperating means on the cover and plate for limiting the turning movement of said plate relative to said cover.

4. In a cover locking mechanism the combination, with a cover, of a plate rockably mounted on said cover, a latch formed on said plate, means for turning said plate relative to said cover to move said latch into and out of engaging relation with a support to connect said cover detachably thereto, an adjustable screw carried by said cover and engaging said plate on the side thereof substantially opposite said latch to tension said plate to provide a predetermined locking friction between said latch and said support, an adjustable screw carried by said cover and adapted to engage said plate adjacent said latch when the latter is disconnected from said support to maintain the position of said plate relative to said cover, and a pair of spaced studs carried by said plate and positioned in the path of and adapted to be engaged by said first screw to limit the turning movement of the plate in the connected and released portions.

5. A cover locking mechanism comprising, in combination, a cover, a plate rockably mounted on said cover, a latch formed on said plate, means for turning said plate relative to said cover to move said latch into and out of engaging relation with a support to connect said cover detachably thereto, an adjustable screw carried by said cover and engaging said plate on the side thereof substantially opposite said latch to tension said plate to provide a predetermined locking friction between said latch and said support, an adjustable screw carried by said cover and adapted to engage said plate adjacent said latch when the latter is disconnected from said support to maintain the position of said plate relative to said cover, a pair of spaced studs carried by said plate and positioned in the path of and adapted to be engaged by said first screw to limit the turning movement of the plate in the connected and released portions, and an embossing formed in said plate adjacent one of said studs and adapted to cooperate therewith to position said first screw therebetween when said latch is connected to said support to yieldably yet releasably retain said latch in connected relation.

6. In a cover locking mechanism, the combination with a cover, of a shaft rockably mounted on said cover, a pin connected to the lower end of said shaft and projecting laterally from the opposite side of and extending normal to the axis of said shaft, a latching plate pivotally mounted on said pin, an operating knob connected to said shaft for rocking said plate relative to said cover, a latch formed on said plate and movable into engagement with a support upon rocking said plate to latch said cover to said support, a screw carried by said cover adjacent said latch and engaging said plate to retain said latch in position to engage said support when said cover is rocked, a flexible portion formed on said plate on the side thereof opposite said latch, and a second screw carried by said cover and engaging said portion and cooperating with said first screw to tension said plate to insure a tight engagement between said latch and said support.

7. In a cover locking mechanism, the combination with a cover, of a plate rockably mounted on said cover for movement substantially parallel thereto, a latch formed on said plate, means for turning said plate substantially in a plane parallel and relative to said cover to move said latch into and out of engaging relation with a support to connect said cover detachably thereto, means on said cover independent of the plate mounting means to position said plate on said cover with the latch in position to engage said support, a flexible portion formed on said plate on the side thereof opposite said latch, and adjustable means carried by said cover and engaging said portion and cooperating with said second means to tension said plate.

MORRIS E. BROWN.

REFERENCES CITED

The following references are of record in the file of this patent:

UNITED STATES PATENTS

| Number | Name | Date |
|---|---|---|
| 597,669 | Dillenbeck | Jan. 18, 1898 |
| 910,283 | Gerst | Jan. 19, 1909 |
| 966,865 | Schuyler | Aug. 9, 1910 |
| 1,729,879 | Krantz et al. | Oct. 1, 1929 |
| 2,181,278 | Lantz, Jr. | Nov. 28, 1939 |

FOREIGN PATENTS

| Number | Country | Date |
|---|---|---|
| 217,578 | Germany | Jan. 5, 1910 |